Figures 1, 2:
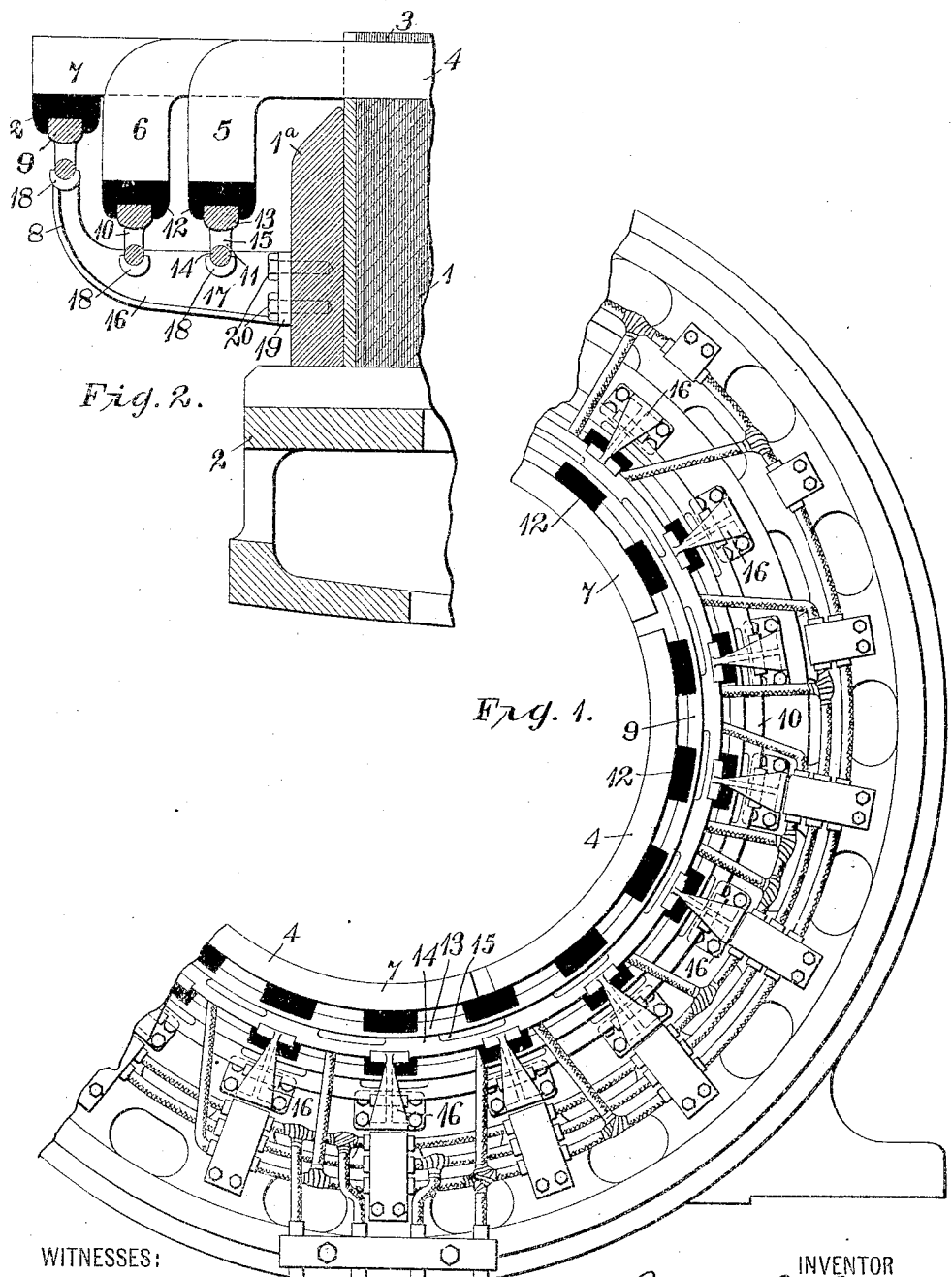

B. G. LAMME.
COIL SUPPORT FOR DYNAMO ELECTRIC MACHINERY.
APPLICATION FILED JUNE 28, 1905.

905,889.

Patented Dec. 8, 1908.

WITNESSES:
Fred. H. Miller

INVENTOR
Benjamin G. Lamme
BY
Wiley E. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

COIL-SUPPORT FOR DYNAMO-ELECTRIC MACHINERY.

No. 905,889.     Specification of Letters Patent.     Patented Dec. 8, 1908.

Application filed June 28, 1905. Serial No. 267,465.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Coil-Supports for Dynamo-Electric Machinery, of which the following is a specification.

My invention relates to dynamo-electric machines and particularly to supporting means for the ends of coils that project beyond the core slots of such machines.

The object of my invention is to provide means for the support of coil ends which shall effectually prevent warping or displacement of the coils under mechanical and electro-magnetic strains and which shall maintain a high degree of insulation.

Tests have shown that the portions of armature coils which project beyond the core slots may be subjected to enormous strains which tend to violently distort the coils and inflict serious damage to them in case the armature is short-circuited. This distortion may be explained as the reaction, upon each other, of stray magnetic fields which are set up by the excessive short-circuited electric currents in different sets of armature coils, since the tendency is apparently greatest in machines having comparatively few poles, and in which the ampere turns are concentrated in a small number of groups, such as high speed turbo-generators.

The explanation included herein is not set forth as necessarily stating the correct reason for the coil distortion, but is merely intended to present a reasonable theory for what takes place when coils that are not properly supported are short-circuited.

In order to meet the above specified conditions, I have devised supports which have such form and arrangement and are so combined with the armature frame, core and winding as to successfully resist all tendency to displacement of said winding, or any part thereof, in any direction.

My invention is illustrated in the accompanying drawings, in which

Figure 1 is a partial end elevation of a stationary armature equipped with coil supports constructed in accordance therewith and Fig. 2 is a partial section through the armature core which further discloses one of the coil supports shown in Fig. 1.

Referring to the drawings, an armature core 1 is supported by an end plate 1ª and a frame 2 and is provided with a plurality of slots 3 in which the magnetizing winding 4 is placed. The conductors in each slot are insulated from each other and are bound together, in the usual manner, to constitute a portion of the magnetizing winding 4.

The windings of stationary, polyphase armatures involve some special disposition of the end connections of the windings, since the windings of one phase overlap the windings of another phase; that is, if one phase winding is considered as the main winding, the other phase windings may be considered as interpolar windings.

In order to avoid interference of the end connections, it is usual to bend the coils away from the center of the core and let the end connections follow a circumferential path concentric with the core face and slightly farther from the center than the bottoms of the slots. The coils from the interpolar slots may then be carried out in straight lines until the first set are avoided and then take a similar form in a plane more distant from the frame. In the same way, all the windings of different phases which are included within the first polar winding may be successively carried out and bent away from the center. However, it is obviously unnecessary to bend down the last set so that the end connections often follow a circumferential path that is concentric with the core face and of substantially equal radius.

The winding illustrated in the accompanying drawing has, for every pole, two coils 5 and 6 that are bent away from the core center after leaving the slots and one straight coil 7. A coil support 8 comprises a plurality of complete rings 9, 10 and 11, of which ring 9 is made with a radius slightly longer than the radius of a circle passing through the bottoms of the core slots 3 so that it may slip over the straight coils 7, the clearance being taken up by a series of spacing blocks 12 which are inserted between the outer surface of the coils and the inner surface of the ring and serve to support that portion of the winding which is not included in the slots 3.

The rings 10 and 11 are made of sufficient radius to slip over the coils 5 and 6, leaving clearance spaces for blocks 12 similar to those used on ring 9. The rings may be of similar cross-section, being provided with an inner body portion 13 having a flat, inner periphery and with an outer portion 14 of curved cross-section, the space between the two portions being provided, at frequent intervals, with openings 15 through which a cord may be passed to bind the coils to the rings. The rings are held in position by means of a plurality of similar supporting brackets 16, each of which comprises an arm 17, three grooved projections 18 which are properly located to receive the curved portions 14 of the rings 9, 10 and 11 and a base piece 19. The brackets 16 are fastened to the end plate 1ᵃ of the core by means of the base piece 19 and bolts 20.

The form and dimensions of the bracket 17 and of the rings 10 may, of course, be varied from what I have shown, and the brackets may be fastened to the frame 2 instead of being bolted to the plate 1ᵃ as indicated. It will also be understood that my invention is not limited to generators as distinguished from motors or to the stationary members as distinguished from the rotary members of machines, except in so far as the character of winding or the service to be performed imposes such limitations.

I claim as my invention:

1. A coil support comprising a ring, a plurality of detachable supporting brackets having laterally projecting seats to receive the outer side of said ring to prevent both radial and longitudinal movement, and means for fastening the brackets to a rigid body.

2. In a dynamo-electric machine, the combination with a magnetizable core, a supporting frame therefor, and a magnetizing winding partially included in a plurality of slots in said core, of supporting means for the portions of said winding which are not included in said slots, said means comprising a ring, a plurality of brackets having laterally projecting seats to receive the outer side of said ring to prevent both radial and longitudinal movement, and means for rigidly connecting the brackets to said frame.

3. In a dynamo-electric machine, the combination with a slotted magnetizable core, a supporting frame therefor and a magnetizing winding partially included in the core slots, of supporting means for the portions of said winding which are not included in said slots, said means comprising a plurality of rings a plurality of brackets, each of which has seats for said rings, and means for rigidly fastening the brackets to said frame.

4. In a dynamo-electric machine, the combination with a winding, and a core and frame therefor, of a set of rings, a set of supporting brackets each of which has seats for said rings, and sets of blocks interposed between the rings and the portions of the winding that project beyond the end of the core.

5. In a dynamo-electric machine, the combination with a frame, a slotted core and coils located in the core slots and projecting beyond their ends, into different planes, of a set of supporting rings, one for the coil ends in each plane, brackets having seats for said rings, and blocks fitted between the coil ends and the rings.

6. In a dynamo-electric machine, the combination with a frame, a slotted core and three sets of coils that project from the core slots into three different planes, of a set of supporting rings for said coil ends, a series of brackets having ring supports and sets of blocks that are fitted between the rings and the corresponding coil ends.

7. In an electrical machine, a frame having a slotted core and coils located in and projecting beyond the ends of the core slots, in combination with a set of brackets supported by the frame adjacent to the projecting coil-ends and a set of supporting rings interposed between the brackets and the coil-ends.

8. In an electrical machine, a frame having a slotted core and coils located in and projecting beyond the ends of the core slots, in combination with a set of brackets supported by the frame adjacent to the projecting coil-ends, a set of supporting rings resting upon the brackets, and blocks interposed between the rings and the coil-ends.

In testimony whereof, I have hereunto subscribed my name this 23rd day of June 1905.

BENJ. G. LAMME.

Witnesses:
ELIZABETH LIVINGSTON,
BIRNEY HINES.